Patented Nov. 18, 1952

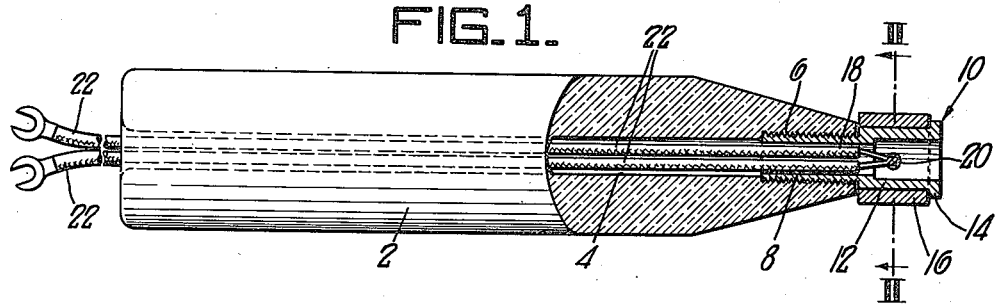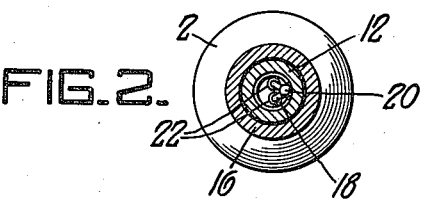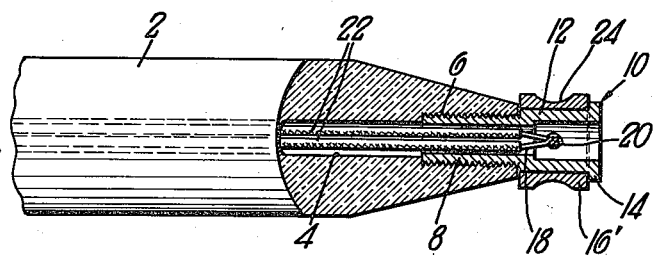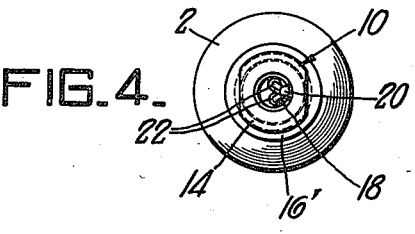

2,618,672

UNITED STATES PATENT OFFICE 2,618,672

APPARATUS FOR MEASURING THE TEMPERATURE OF A MOVING SURFACE

Louis Cizmadia and Robert J. Maloit, Trenton, N. J.

Application December 21, 1951, Serial No. 262,836

2 Claims. (Cl. 136—4)

The present invention relates to apparatus for measuring temperature and more particularly to an improved thermocouple especially suitable for measuring the temperatures of moving surfaces.

It is an object of our invention to provide a thermocouple for measuring the temperature of elongated material, such as wire or strip and the like, while it is moving at variable speeds without interrupting the motion of the material or causing any damage thereto.

This and other objects will become more apparent after referring to the following specification and attached drawings, in which:

Figure 1 is a plan view partly in longitudinal section;

Figure 2 is a cross-sectional view taken on the line II—II of Figure 1;

Figure 3 is a view similar to Figure 1 showing a modified contact ring; and

Figure 4 is an end view of Figure 3 looking toward the head of the bearing sleeve.

Referring more particularly to the drawings, reference numeral 2 indicates generally the main body member of our apparatus which comprises an elongated handle made of hard dielectric material such as porcelain or the like. Body member 2 is constructed with a bore 4 therethrough which is threaded at one end 6 to receive the threaded end 8 of a bearing sleeve 10. The bearing sleeve 10, which is preferably made of material having a high thermal conductivity such as pure copper or silver, has a smooth surface portion 12 and a head 14 of enlarged diameter which project outwardly of the body 2 as shown in Figures 1 and 3. A contact ring 16, which may be made of the same material as the sleeve 10, is rotatably mounted around the smooth portion 12 of the bearing sleeve. The bearing sleeve 10 is threaded into the body member a sufficient distance to prevent end play of the sleeve and at the same time permit the rotating contact ring 16 to turn freely.

In order to prevent excessive heat loss and the need for compensating tables, it is necessary that the body of the contact 16 and the walls of the bearing sleeve 10 be kept to a minimum thickness.

A thermocouple 18, which may be of the iron constantan type, is disposed with its hot junction 20 silver-soldered in the hollow sleeve bearing 10 at a point approximately coincidental with the center of rotation of the contact ring 16. It is necessary that the hot junction of the thermocouple be soldered directly under the contact ring at a point as close as possible to its center of rotation. Failure to do this creates non-uniformity of distance and metal thickness between the hot junction and the surface being measured which in turn causes non-uniform heat loss and consequent inaccurate measurements. The lead wires 22 of the thermocouple extend from the hot junction through the bore 4 to project outwardly of the body 2.

If it is desired, the shape of the contact ring may be changed in accordance with the shape of the material being checked. For example, a groove 24 as shown in the contact ring modification 16' of Figure 3 may be provided where the temperature of wire is to be measured. The groove insures that the maximum amount of surface contact will be made between the wire and the rotating ring.

In order to further minimize the need for compensating tables we have found it preferable to use pure copper for both the contacting rings 16 and the threaded sleeve 10. Silver has also been found to perform satisfactory for this purpose. When other metals having poor thermal conductivity are utilized it is necessary to make up and use calibration tables to obtain true temperatures.

In operation the lead wires 22 are attached to a standard potentiometer, not shown, and the rotating ring 16 is held in contact with the moving material. This contact is maintained until a steady reading of the potentiometer scale may be obtained.

If desired, the lead wires may be connected to a recording potentiometer to obtain a running temperature over a given period of time.

It is also possible to use our apparatus in conjunction with an electronic recorder and the cooling controls of a processing apparatus to regulate the temperature of the material during the processing operation.

While we have shown but one embodiment of our invention it will be apparent that other adaptations and modifications may be made without departing from the scope of the following claims.

We claim:

1. Apparatus for measuring the temperature of a moving surface comprising an elongated bored body member, a hollow bearing sleeve fitted in one end of said bore with a portion thereof projecting outwardly of the body member, a contact ring rotatably mounted on the projecting portion of said bearing sleeve, and a thermocouple having a hot junction terminal at one end carried by said body member and said sleeve with its hot junction fixed in the projecting portion of said sleeve at a point surrounded by said ring and its other end extending through said bore.

2. Apparatus for measuring the temperature of a moving surface comprising an elongated bored body member, said bore having an internally threaded portion at one end, a hollow bearing sleeve having an externally threaded portion at one end, a head of enlarged diameter at its opposite end and a smooth surface intermediate the head and threaded end, said sleeve being disposed with its first named end threaded into the threaded portion of said bore and said intermediate portion and head projecting outwardly of the body member, a contact ring rotatably mounted on said projecting intermediate portion of said sleeve, and a thermocouple having a hot junction terminal at one end carried by said body member and said sleeve with its hot junction fixed in the intermediate portion of said sleeve at a point surrounded by said ring and its other end extending through said bore.

LOUIS CIZMADIA.
ROBERT J. MALOIT.

REFERENCES CITED

The following references are of record in the file of this patent:

UNITED STATES PATENTS

| Number | Name | Date |
|---|---|---|
| 2,007,118 | Bosomworth | July 2, 1935 |
| 2,425,557 | Obermaier | Aug. 12, 1947 |